United States Patent
Takimoto (10) Patent No.: US 7,106,387 B2
(45) Date of Patent: Sep. 12, 2006

(54) KEYED CLAMP CIRCUIT

(75) Inventor: Takamasa Takimoto, Oizumi-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 435 days.

(21) Appl. No.: 10/736,904

(22) Filed: Dec. 17, 2003

(65) Prior Publication Data

US 2004/0165116 A1     Aug. 26, 2004

(30) Foreign Application Priority Data

Dec. 17, 2002   (JP)  .............................. 2002-365472

(51) Int. Cl.
*H04N 5/18*     (2006.01)
(52) U.S. Cl. .................. 348/695; 348/689; 348/684
(58) Field of Classification Search ................ 348/695, 348/689, 684, 691, 692, 682, 257; H04N 5/18, H04N 5/53
See application file for complete search history.

(56) References Cited

U.S. PATENT DOCUMENTS 5,231,507 A * 7/1993 Sakata et al. ................. 386/19
5,280,356 A * 1/1994 Hiramatsu et al. .......... 348/691
5,461,489 A * 10/1995 Ohara et al. ................. 348/689

* cited by examiner

*Primary Examiner*—Sherrie Hsia
(74) *Attorney, Agent, or Firm*—Morrison & Foerster LLP (57) ABSTRACT

The keyed clamp circuit of this invention has the clamp circuit for clamping the video signal including the equalizing pulse and the vertical synchronization signal based on the clamp pulse, the synchronization signal separation circuit for separating the synchronization signal from the video signal clamped by the clamp circuit, and the clamp pulse generation circuit for generating the clamp pulse based on the synchronization signal from the synchronization signal separation circuit. The clamp pulse for the equaling pulse with a pulse width, which is shorter during the equalizing pulse period compared to the pulse width during the vertical synchronization signal period, is generated. The clamp pulse can be generated based on the equalizing pulse and the vertical synchronization signal, performing the keyed clamping on the video signal even during the blanking pulse period.

11 Claims, 6 Drawing Sheets

FIG.4A
PRIOR ART horizontal synchronization

FIG.4B
PRIOR ART clamp pulse

FIG.4C
PRIOR ART equalizing pulse

KEYED CLAMP CIRCUIT

BACKGROUND OF THE INVENTION

1. Field of the Invention

This invention relates to a keyed clamp circuit that performs clamping to a video signal, especially to a keyed clamp circuit that can accurately clamp a video signal with an equalizing pulse and a vertical synchronization signal.

2. Description of the Related Art

The edge level of a horizontal synchronization signal needs to be kept at a certain level in an analog video signal. A clamp circuit can be used as a circuit for equalizing the edge level of the horizontal synchronization signal of a video signal. A keyed clamp circuit is a type of the clamp circuit.

A sync tip clamp of the keyed clamp circuit equalizes the edge level of the horizontal synchronization signal with a reference level while clamp pulses are coming, equalizing the direct current level at the edge of the horizontal synchronization signal. The clamp pulse is generated during the horizontal synchronization signal period. When there is a difference in the direct current level between the reference level and the direct current level at the edge of the horizontal synchronization signal during the clamp pulse period, the difference is detected and a capacitor is charged by the voltage difference. The video signal is superimposed on the voltage of the capacitor. Therefore, the edge level of the horizontal synchronization signal of the video signal is equalized.

Figure 2:
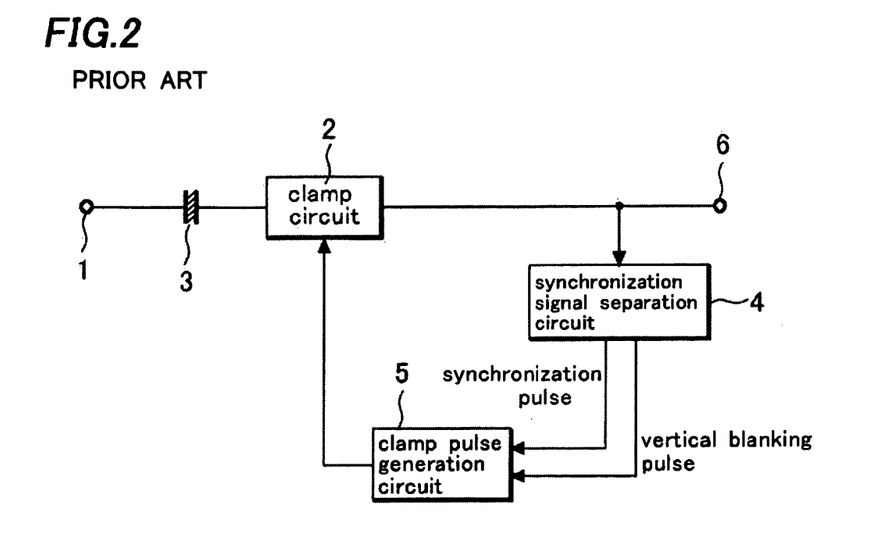
FIG. 2 is a block diagram of a conventional keyed clamp circuit.
Figures 3A, 3B:
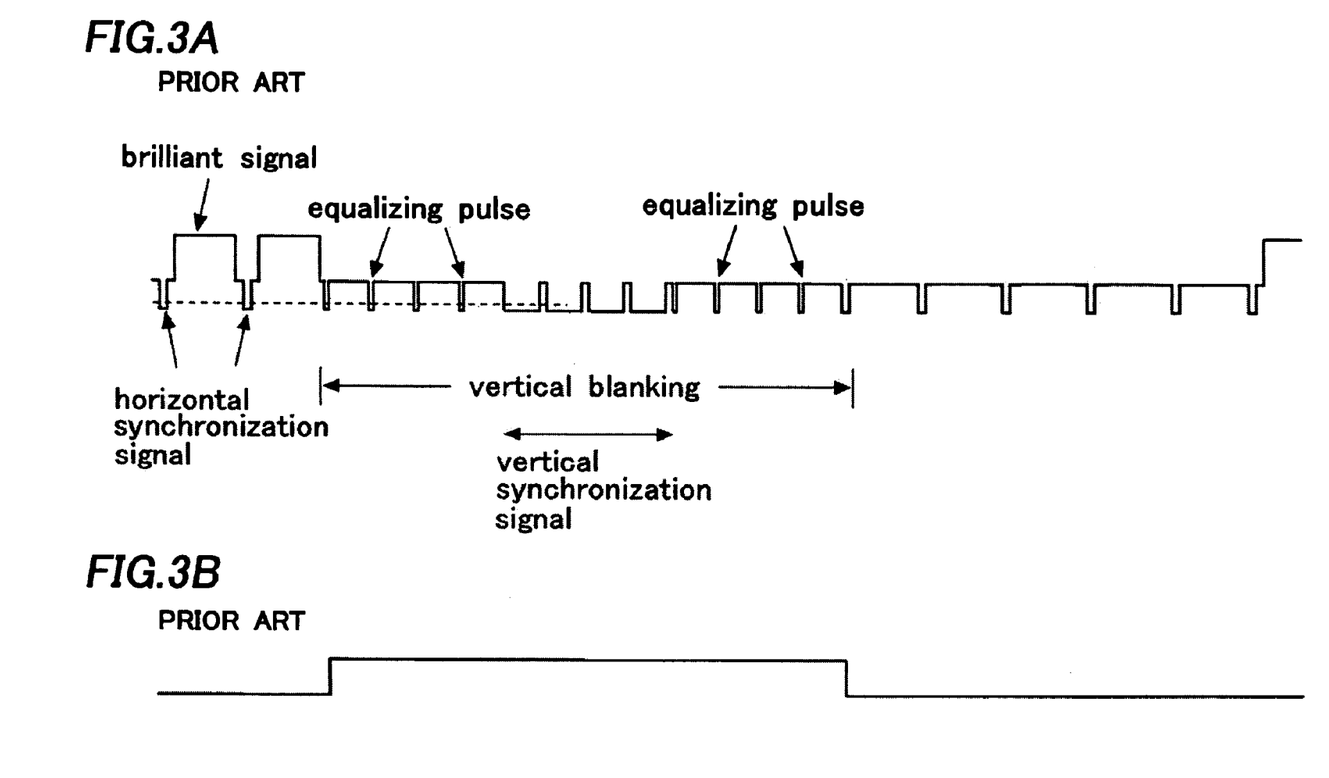
FIGS. 3A and 3A show waveforms of a composite video signal.

FIG. 2 is a block diagram of the keyed clamp circuit. An input terminal 1 in FIG. 2 receives the video signal shown in FIGS. 3A and 3B. FIG. 3A shows a composite video signal, which includes a vertical synchronization signal, the horizontal synchronization signal, an equalizing pulse, and a brilliant signal. The video signal from the input terminal 1 is then applied to a synchronization signal separation circuit 4 after being clamped by the clamp circuit 2 and a capacitor 3 for stopping direct current.

The synchronization signal separation circuit 4 slices the composite video signal shown in FIG. 3A at the level shown as a dotted line in the figure. The synchronization signal separation circuit 4 also generates a vertical blanking pulse shown in FIG. 3B. The synchronization signal sliced at the level shown as the dotted line in FIG. 3A is then applied to a clamp pulse generation circuit 5. The clamp pulse generation circuit 5 applies the synchronization signal to the clamp circuit 2.

However, the clamp pulse generation circuit 5 does not apply the synchronization signal to the clamp circuit 2 during the entire period. The clamp pulse generation circuit 5 does not apply the synchronization signal to the clamp circuit 2 during a blanking pulse period when the blanking pulse shown in FIG. 3B is generated. Therefore, the clamp circuit 2 performs clamping during the period except the blanking pulse period. The clamped composite video signal is obtained at an output terminal 6 through this operation.

Figure 4A:
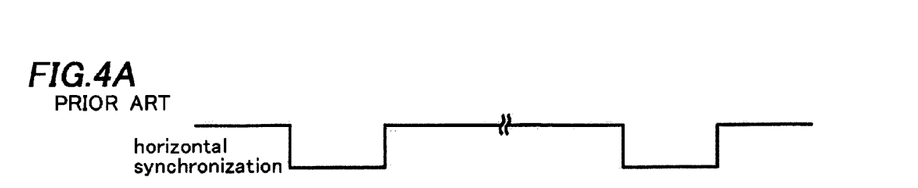
FIGS. 4A, 4B and 4C show waveforms used with the clamp circuit of FIG. 2.
Figure 4B:
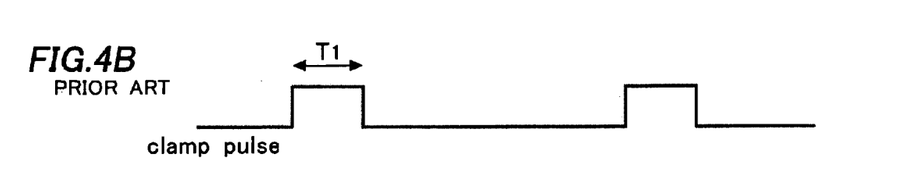
Figure 4C:
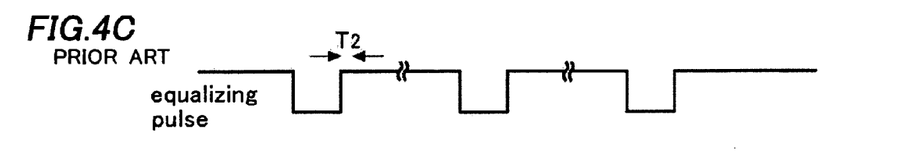

The reason why the clamp circuit 2 does not perform the clamping of the video signal during the blanking pulse period will be explained. FIG. 4A shows the horizontal synchronization signal, and FIG. 4B shows the clamp pulse generated from the horizontal synchronization signal in FIG. 4A by the keyed clamp circuit shown in FIG. 2. The level of the horizontal synchronization signal shown in FIG. 4A is detected during the T1 period shown in FIG. 4B. FIG. 4C shows the equalizing pulse. The pulse width and the cycle of the equalizing pulse are a half of those of the horizontal synchronization signal. Therefore, when the level of the equalizing pulse shown in FIG. 4C is detected during the T1 period shown in FIG. 4B, the edge level of the equalizing pulse can not be detected correctly, because the level during the T2 period shown in FIG. 4C will be also detected.

Therefore, the clamp circuit 2 does not perform clamping to the video signal during the blanking pulse period when the equalizing pulse is present.

However, if the clamping of the video signal is not performed during the blanking pulse period, the average direct current level becomes lower compared to the period when there is a brilliant signal, because there is no brilliant signal during the blanking pulse period. When this sort of signal goes through the capacitor 3 for stopping a direct current, a phenomenon called V-sag, where the average direct current level of the video signal goes up, will take place. Although the keyed clamp can absorb V-sag, V-sag can not be absorbed when the clamp pulse is stopped during the blanking pulse period.

Therefore, the clamp circuit that is capable of performing keyed clamping by generating the clamp pulse according to the equalizing pulse and the vertical synchronization signal even during the blanking pulse period is preferable.

SUMMARY OF THE INVENTION

This invention is directed to solve the problems mentioned above. The keyed clamp circuit of this invention includes a clamp circuit, which clamps a composite video signal including an equalizing pulse and a vertical synchronization signal based on a clamp pulse, a synchronization signal separation circuit, which separates a synchronization signal from the composite video signal clamped by the clamp circuit, and a clamp pulse generation circuit for generating the clamp pulse based on the synchronization signal from the synchronization signal separation circuit. The characteristic of this invention is that the clamp pulse for the equalizing pulse, which has the pulse width shorter than the clamp pulse generated during a vertical synchronization signal period, is generated during an equalizing pulse period.

The keyed clamp circuit of this invention includes a clamp circuit, which clamps a composite video signal including an equalizing pulse, a synchronization signal separation circuit, which separates a synchronization signal from the composite video signal clamped by the clamp circuit, a charging circuit, which charges up a capacitor based on the synchronization signal from the synchronization signal separation circuit, a discharging circuit for discharging the capacitor, a comparator, which compares the level of the charging voltage with the level of a reference voltage, and a clamp pulse generation circuit, which generates the clamp pulse. The characteristic of this invention is that the ratio of charging of the charging circuit and discharging of the discharging circuit is determined in such way that the clamp pulse for the equalizing pulse, which has the pulse width shorter than the clamp pulse generated during the clamp pulse period, is generated.

Additionally, the keyed clamp circuit of this invention includes a clamp circuit, which clamps a composite video signal including an equalizing pulse and a vertical synchronization signal based on a clamp pulse, a synchronization signal separation circuit, which separates a synchronization signal from the composite video signal clamped by the clamp circuit, a charging circuit, which charges up a capacitor based on the synchronization signal from the synchronization signal separation circuit, a discharging circuit for discharging the capacitor, a comparator, which compares the level of the charging voltage with the level of a reference voltage, and the clamp pulse generation circuit, which generates a clamp pulse. The characteristic of this invention is that the ratio of charging of the charging circuit and the discharging of the discharging circuit is determined in such way that the clamp pulse for the vertical synchronization signal, which has a pulse width longer than the clamp pulse generated during a clamp pulse period, is generated during the vertical synchronization signal period.

DETAILED DESCRIPTION OF THE INVENTION

An embodiment of this invention will be explained by referring to FIG. 1. The reference numeral 50 in FIG. 1 denotes an input terminal, to which a composite video signal including a vertical synchronization signal, a horizontal synchronization signal, an equalizing pulse, and a brilliant signal is applied. The reference numeral 51 indicates a capacitor for clamping, the reference numeral 52 a clamp circuit for clamping the composite video signal with the capacitor, respectively. The reference numeral 53 denotes a synchronization signal separation circuit, which separates a synchronization signal and the vertical synchronization signal from the composite video signal clamped by the clamp-circuit 52.

The reference numeral 54 indicates an output terminal of the clamped video signal. The reference numeral 55 denotes a clamp pulse generation circuit that includes a charging circuit for charging a capacitor 56 according to the synchronization signal from the synchronization signal separation circuit 53, a discharging circuit for discharging the capacitor 56, and a comparator 57 for comparing the level of the charging voltage with the level of a reference voltage Vref. This is a clamp pulse generation circuit for generating a clamp pulse.

Figure 1:
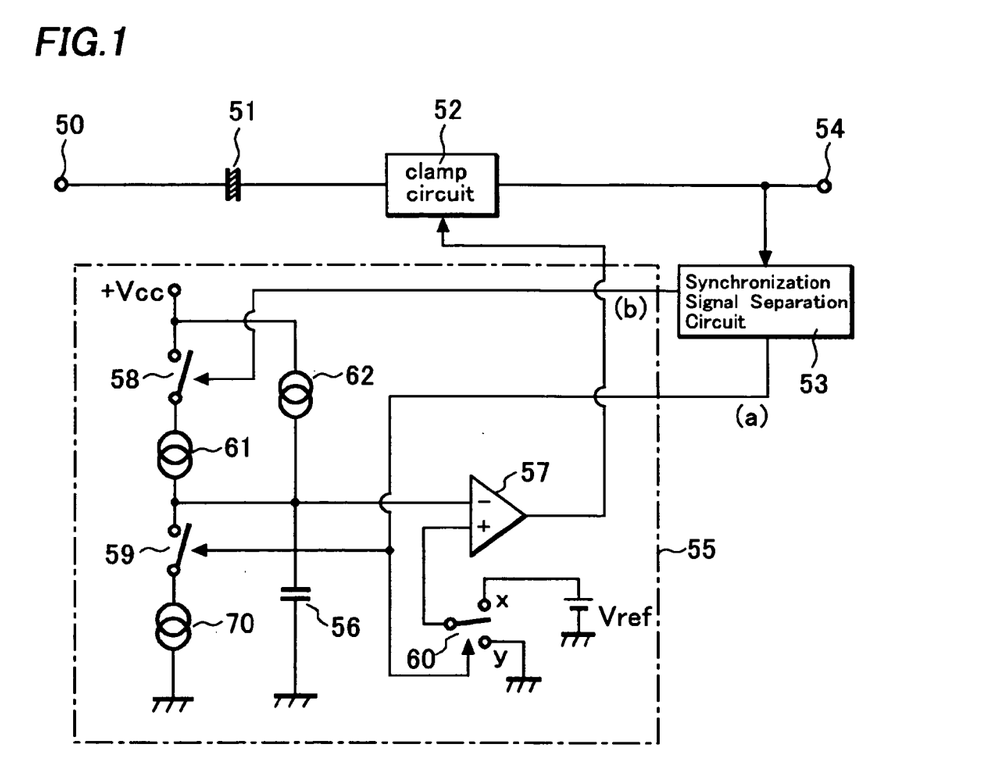
FIG. 1 is a block diagram of a keyed clamp circuit of an embodiment of this invention.

The video signal shown in FIG. 3A is applied to the input terminal 50 shown in FIG. 1. FIG. 3A shows the composite video signal including the vertical synchronization signal, the horizontal synchronization signal, the equalizing pulse, and the brilliant signal. The video signal from the input terminal 50 is clamped by the clamp circuit 52 and the capacitor 51 and then, applied to the synchronization signal separation circuit 53.

The synchronization signal separation circuit 53 performs synchronization separation and applies the horizontal synchronization signal as well as the vertical synchronization signal to the clamp pulse generation circuit 55. The clamp pulse generation circuit 55 generates the clamp pulse with the pulse width suitable for clamping the equalizing pulse, which has the pulse width shorter than that of the horizontal synchronization signal, during an equalizing pulse period.

The clamp pulse generation circuit 55 generates the clamp pulse with the pulse width necessary for preventing V-sag during a vertical synchronization signal period. If the clamp pulse with a long pulse width is applied to the clamp circuit 52, it is possible to charge or discharge the capacitor 51 for a long period of time.

Therefore, even if V-sag can not be prevented by the clamp pulse based on the equalizing pulse alone, it is possible to correct the level of direct current and prevent V-sag by adding the clamp pulse based on the vertical synchronization signal.

The operation of the clamp pulse generation circuits 55 will be explained below. The synchronization signal separation circuit 53 slices the composite video signal shown in FIG. 3A at the level shown as a dotted line in the figure. During a V-blanking period of the composite video signal shown in FIG. 3A, there are the equalizing pulses with H/2 cycle (H denotes one cycle of the horizontal synchronization signal) and the vertical synchronization signal. Another pulse with H/2 cycle, which is called as "cut-in pulse," is embedded in the vertical synchronization signal.

Figures 5A, 5B:
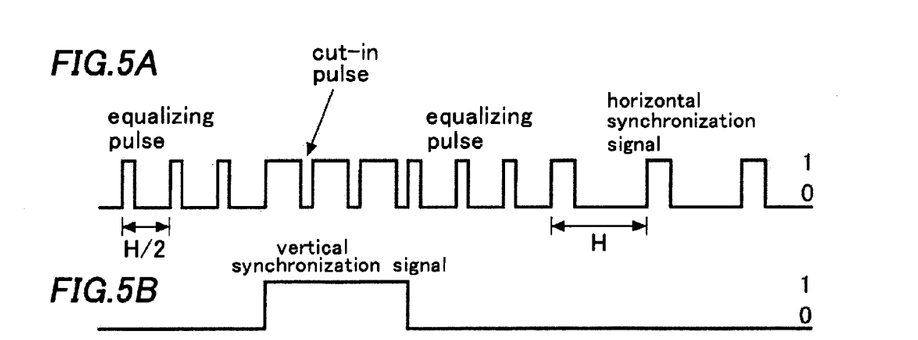
FIGS. 5A–5D show waveforms used with the clamp circuit of the embodiment.

FIG. 5A shows the enlarged and inverted waveform of the pulse during the V-blanking period of FIG. 3A. The synchronization signal shown in FIG. 5A is applied to the clamp pulse generation circuit 55 as a signal (a) from the synchronization signal separation circuit 53 shown in FIG. 1. Among the synchronization signals shown in FIG. 5A, the vertical synchronization signal alone is separated, becoming the vertical synchronization signal shown in FIG. 5B. Then this vertical synchronization signal shown in FIG. 5B is applied to the clamp pulse generation circuit 55 as the signal (b) from the synchronization signal separation circuit 53 shown in FIG. 1. When the pulse is "0" (low level) in FIG. 5B, the switch 58 of the clamp pulse generation circuit 55 is closed.

When the pulse is "0" in FIG. 5A, the switch 59 of the clamp pulse generation circuit 55 is closed. When the pulse is "1" (high level), the switch 59 is open. A switch 60 connected to the positive input terminal (+) of the comparator 57 turns toward y-side when the pulse is "0", and it turns toward x-side when the pulse is "1" in FIG. 5A.

Figure 5C:
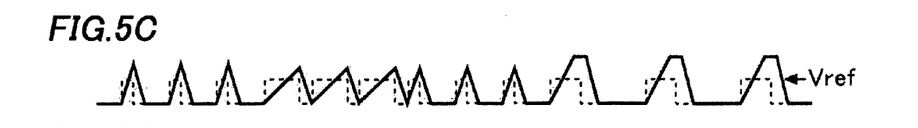

Therefore, when the equalizing pulse shown in FIG. 5A is added, the switch 59 opens, and the switch 60 turns toward x-side. Then the capacitor 56 is charged with the current of the constant current sources 61 and 62. The voltage increase at this point is shown as a line in FIG. 5C. The dotted line in FIG. 5C shows the reference level for being connected to the positive input terminal (+) of the comparator 57. The enlarged version of the comparison of the levels at the comparator 57 is shown in FIGS. 6A–6C.

Figure 6A:
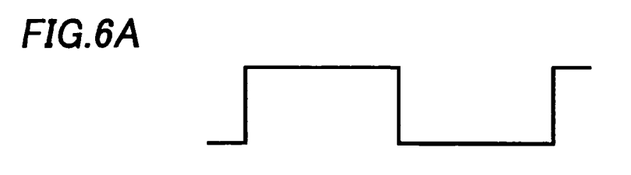
FIGS. 6A, 6B and 6C show waveforms used with the clamp circuit of the embodiment.
Figure 6B:
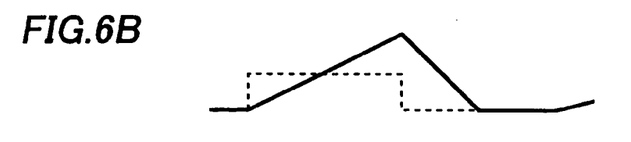
Figure 6C:
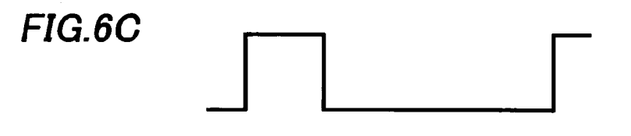

FIG. 6A shows the equalizing pulse. The solid line in FIG. 6B shows the voltage at the negative input terminal (−) of the comparator 57, the dotted line in FIG. 6B shows the voltage at the positive input terminal (+) of the comparator 57. FIG. 6C shows the output level of the comparator 57. Since the voltage of the negative input terminal of the comparator 57 is lower than the voltage of the positive input terminal until the middle of the equalizing pulse, the output level of the comparator 57 is "1".

Then, the charging of the capacitor 56 by the current of constant current sources 61 and 62 further continues, making the output level of the comparator 57 0. The pulse shown in FIG. 6C becomes the clamp pulse for the equalizing pulse. The width of this pulse is half the width of the equalizing pulse. When this clamp pulse is applied to the clamp circuit 52, the edge level of the equalizing pulse can be accurately clamped.

Figure 5D:
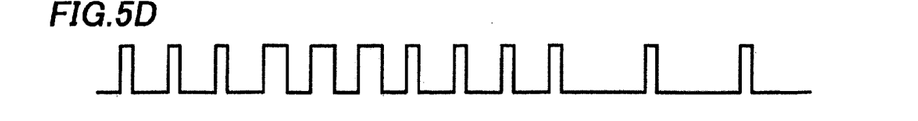

A constant current source 70 functions as the discharging circuit. The constant current sources 61 and 62 function as the charging circuit. The onset incline of the pulse and the incline of the pulse when it starts coming down shown in FIG. 5C can be changed by adjusting the current values of the constant current source 70 and the constant current sources 61, 62. Also, the onset incline of the pulse during the vertical synchronization period can different from that during the rest of the period by adjusting current ratio of the constant current sources 61 and 62. The pulse width of the pulse shown in FIG. 5D can be arbitrary changed by adjusting the onset incline of the pulse and the incline of the pulse when it starts coming down.

Therefore, according to this embodiment, it is possible to perform keyed clamping even during the equalizing pulse period, decreasing the incidence of V-sag.

The pulse width of the equalizing pulse is narrower than the horizontal and vertical synchronization signals, as shown in FIG. 5A. Therefore, the direct current correction ability of the circuit is somewhat low, causing V-sag depending upon the level of the brilliant signal coming right before the equalizing pulse. Therefore, the clamping is also performed during the vertical synchronization signal period in addition to the equalizing pulse period, in this embodiment. In this case, utilizing the fact that the vertical synchronization signal has a longer pulse width, the width of the clamp pulse is made larger and the duration for direct current correction are extended.

In the embodiment of FIG. 1, the pulse width of the vertical synchronization signal is made longer by using the switch 58 and the constant current source 61. The switch 58 of the clamp pulse generation circuit 55 is open when the pulse shown in FIG. 5B is "1". When the switch 58 is open, the current of the constant current source 61 does not go through. The current for charging decreases during the vertical synchronization signal period, because only the current of the constant current source 62 is available during this period. The ratio of the currents between the constant current sources 61 and 62 should preferably be about 25:1.

Figure 7A:
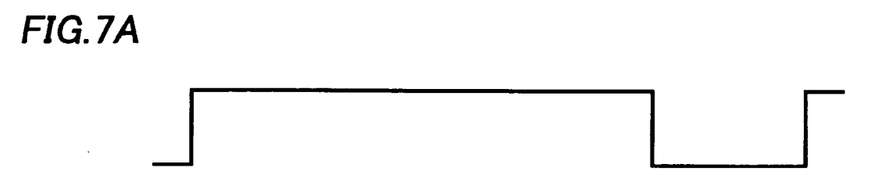
FIGS. 7A, 7B and 7C show waveforms used with the clamp circuit of the embodiment.
Figure 7B:
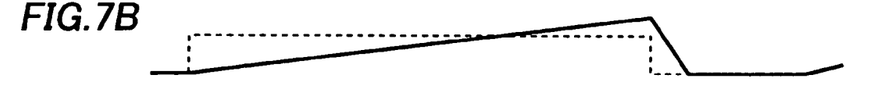
Figure 7C:
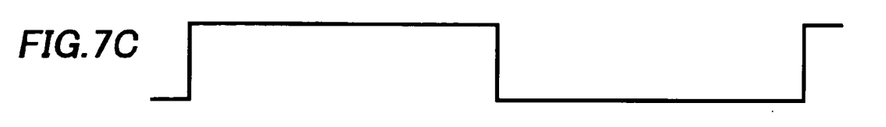

FIG. 7A shows the vertical synchronization signal. The solid line in FIG. 7B shows the voltage at the negative input terminal (−) of the comparator 57, the dotted line in FIG. 7B shows the voltage at the positive input terminal (+) of the comparator 57. FIG. 7C shows the output level of the comparator 57. As it is clear from the comparison between FIG. 7A and FIG. 7B, the pulse with a half of the pulse width of the vertical synchronization signal is applied to the clamp circuit 52. Therefore, the edge level of the vertical synchronization signal can be accurately clamped.

Thus, according to the block diagram shown in FIG. 1, clamping of the video signal can be performed during the V-blanking period, reducing V-sag and obtaining the signal, which is clamped at the edge of the synchronization signal.

Figure 8:
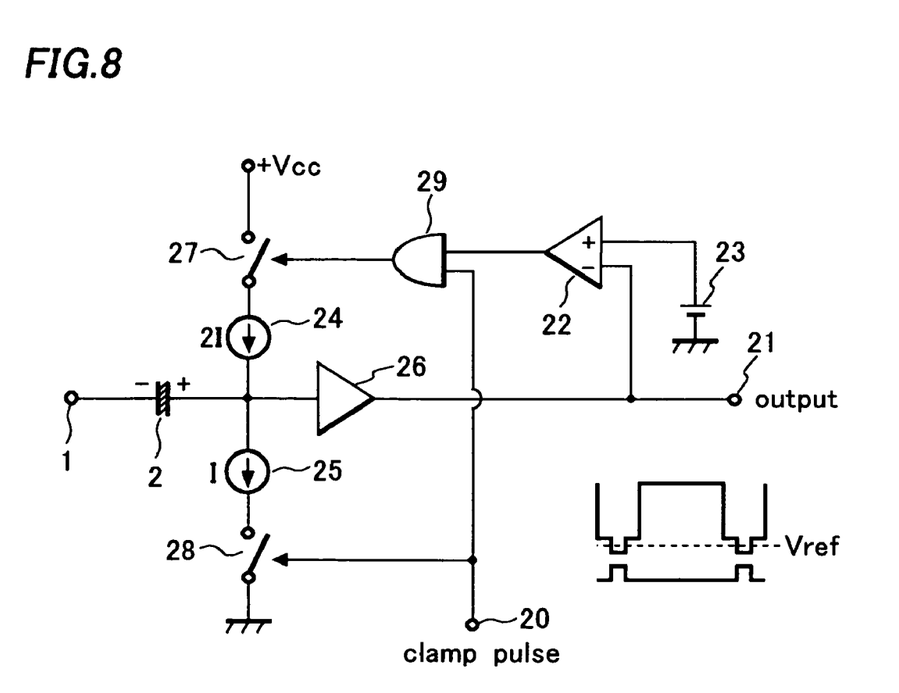
FIG. 8 is a circuit diagram of the clamp circuit of the embodiment.

FIG. 8 shows an example of the clamp circuit 52. The operation of the clamp circuit 52 will be briefly explained. The clamp circuit 52 is to equalize the direct current level at the edge of the horizontal synchronization signal by equalizing the edge level of the horizontal synchronization signal with that of the reference level during a horizontal synchronization signal period. The composite video signal is obtained at an input terminal 1, the clamp pulse at a terminal 20, and the clamped composite video signal at an output terminal 21.

The circuit shown in FIG. 8 can equalize the direct current level at the edge of the horizontal synchronization signal with the value Vref of a reference voltage source 23 connected to the comparator 22. The current value of a constant current source 24 is set at 2I and the current value of a constant current source 25 at I, respectively. The composite video signal from the input terminal 1 is outputted to the output terminal 21 through a buffer 26 after reproduced as a certain direct current voltage by a capacitor 2.

The level of the composite video signal at the output terminal 21 is compared to the level of the value Vref of the reference voltage source 23 of the comparator 22. When the direct current level at the edge of the horizontal synchronization signal is smaller than the Vref, the output signal of the comparator 22 becomes H level. The clamp pulse, which becomes H level during a clamp period, comes from the terminal 20. Switches 27 and 28 are closed at H level. Since the output of an and-gate 29 becomes H level, the both switches 27 and 28 are closed.

Then, the current I goes from the constant current source 24 to the input terminal 1, charging the capacitor 2. When the capacitor 2 is charged with the polarity shown in the figure, the output direct current level of the buffer 26 goes up. When the increase of the output direct current level continues, and the output direct current level at the edge of the horizontal synchronization signal exceeds the value Vref, the output signal of the comparator 22 becomes L level. Then, the output of the and-gate 29 becomes L level at the next clamp pulse, opening the switch 27 and closing the switch 28.

Next, the current I goes from the capacitor 2 to the ground, discharging the capacitor 2. When the capacitor 2 is discharged, the output direct current level of the buffer 26 goes down. These operations are repeated, fixing the direct current level at the edge of the horizontal synchronization signal of the output terminal 21 at the value Vref during the clamp pulse period. As a result, the video signal during the periods other than the horizontal synchronization signal period is also superimposed with the corrected direct current and obtained at the output terminal 21. Therefore, the circuit shown in FIG. 8 can perform keyed clamping.

What is claimed is:

1. A keyed clamp circuit comprising:
   a clamp circuit clamping a video signal including an equalizing pulse and a vertical synchronization signal based on a clamp pulse;
   a synchronization signal separation circuit separating a synchronization signal from the video signal clamped by the clamp circuit; and
   a clamp pulse generation circuit generating the clamp pulse for the clamp circuit so that a pulse width of the clamp pulse is shorter, during an equalizing pulse period, than a vertical synchronization signal period, based on the synchronization signal from the synchronization signal separation circuit.

2. A keyed clamp circuit comprising:
   a clamp circuit clamping a video signal including an equalizing pulse based on a clamp pulse;
   a synchronization signal separation circuit separating a synchronization signal from the video signal clamped by the clamp circuit; and
   a clamp pulse generation circuit generating the clamp pulse for the clamp circuit so that a pulse width of the clamp pulse is shorter than a pulse width of the equalizing pulse during an equalizing pulse period, based on the synchronization signal from the synchronization signal separation circuit.

3. The keyed clamp circuit of claim 2, wherein the clamp pulse generation circuit comprises a capacitor, a charging circuit charging the capacitor based on the synchronization signal from the synchronization signal separation circuit and a discharging circuit discharging the capacitor and a comparator comparing a charging voltage of the capacitor with a reference voltage.

4. The keyed clamp circuit of claim 3, wherein a current ratio of the charging circuit to the discharging circuit is set to generate the clamp pulse for the clamp circuit.

5. A keyed clamp circuit comprising:
a clamp circuit clamping a video signal including an equalizing pulse and a vertical synchronization signal based on a clamp pulse;
a synchronization signal separation circuit separating a synchronization signal from the video signal clamped by the clamp circuit;
a clamp pulse generation circuit generating a clamp pulse for the clamp circuit so that a pulse width of the clamp pulse during a vertical synchronization signal period is longer than the pulse width of the clamp pulse during an equalizing pulse period, based on the synchronization signal from the synchronization signal separation circuit.

6. The keyed clamp circuit of claim 5, wherein the clamp pulse generation circuit comprises a capacitor, a charging circuit charging the capacitor based on the synchronization signal from the synchronization signal separation circuit and a discharging circuit discharging the capacitor and a comparator comparing a charging voltage of the capacitor with a reference voltage.

7. The keyed clamp circuit of claim 6, wherein a current ratio of the charging circuit to the discharging circuit is set to generate the clamp pulse for the clamp circuit.

8. The keyed clamp circuit of claim 6, wherein a current ratio of the charging circuit to the discharging circuit is set according to the vertical synchronization signal.

9. The keyed clamp circuit of claim 6, wherein the clamp pulse generation circuit further comprises a constant current source turning on and off based on the vertical synchronization signal.

10. The keyed clamp circuit of claim 6, wherein the clamp pulse generation circuit further comprises a switch opening and closing based on the vertical synchronization signal and a constant current source turning on and off based on the opening and closing of the switch.

11. The keyed clamp circuit of claim 6, wherein a voltage of the comparator changes based on the synchronization signal from the synchronization signal separation circuit.

* * * * *